(12) United States Patent
Tsuchiya

(10) Patent No.: US 10,948,791 B2
(45) Date of Patent: Mar. 16, 2021

(54) LIQUID CRYSTAL DEVICE AND ELECTRONIC APPARATUS

(71) Applicant: SEIKO EPSON CORPORATION, Tokyo (JP)

(72) Inventor: Yutaka Tsuchiya, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 16/430,564

(22) Filed: Jun. 4, 2019

(65) Prior Publication Data
US 2019/0369450 A1 Dec. 5, 2019

(30) Foreign Application Priority Data
Jun. 5, 2018 (JP) .............................. JP2018-107628

(51) Int. Cl.
| | |
|---|---|
| *G02F 1/1335* | (2006.01) |
| *G02F 1/1362* | (2006.01) |
| *H04N 9/31* | (2006.01) |
| *G02F 1/1368* | (2006.01) |

(52) U.S. Cl.
CPC ...... *G02F 1/136209* (2013.01); *G02F 1/1368* (2013.01); *G02F 1/133502* (2013.01); *G02F 1/133526* (2013.01); *G02F 1/136286* (2013.01); *H04N 9/3197* (2013.01); *G02F 2201/123* (2013.01); *G02F 2203/01* (2013.01)

(58) Field of Classification Search
CPC ......... G02F 1/133345; G02F 1/133526; G02F 1/136209; G02F 1/133502
See application file for complete search history.

(56) References Cited

U.S. PATENT DOCUMENTS

| 7,663,305 B2 * | 2/2010 | Yamazaki | ........... | H01L 51/5284 313/506 |
| 2010/0208158 A1 * | 8/2010 | Chen | ................. | G02F 1/133502 349/56 |
| 2012/0249911 A1 * | 10/2012 | Kamino | ........... | G02F 1/136209 349/42 |

(Continued)

FOREIGN PATENT DOCUMENTS

| JP | 3991569 B2 | 10/2007 |
| JP | 2013-073181 A | 4/2013 |

(Continued)

OTHER PUBLICATIONS

Oikawa, English translation (Year: 2016).*

*Primary Examiner* — Michael H Caley
*Assistant Examiner* — Jonathan Y Jung
(74) *Attorney, Agent, or Firm* — Oliff PLC

(57) ABSTRACT

A liquid crystal device including a base member that is transmissive, a pixel electrode that is transmissive, a first insulator that is transmissive and that is disposed between the base member and the pixel electrode, and a second insulator that is transmissive and that surrounds and abuts the first insulator in a plan view from a thickness direction of the base member. The first insulator includes a first portion having a refractive index higher than a refractive index of the second insulator, and a second portion positioned between the base member and the first portion and having a refractive index lower than the refractive index of the first portion and higher than the refractive index of the second insulator.

8 Claims, 11 Drawing Sheets

(56) References Cited

U.S. PATENT DOCUMENTS

2015/0193058 A1\* 7/2015 Kang .................... G06F 3/0446
　　　　　　　　　　　　　　　　　　　　　　345/174
2016/0322602 A1\* 11/2016 Jung ................... H01L 27/1225

FOREIGN PATENT DOCUMENTS

| JP | 2016-80956 A | | 5/2016 |
|---|---|---|---|
| JP | 2016080956 A | \* | 5/2016 |
| JP | 2018-185418 A | | 11/2018 |

\* cited by examiner

LIQUID CRYSTAL DEVICE AND ELECTRONIC APPARATUS

The present application is based on, and claims priority from JP Application Serial Number 2018-107628, filed Jun. 5, 2018, the disclosure of which is hereby incorporated by reference herein in its entirety.

BACKGROUND

1. Technical Field

The present disclosure relates to a liquid crystal device and an electronic apparatus.

2. Related Art

A liquid crystal device has been used as a light valve of a liquid crystal projector. An ordinary liquid crystal device includes a thin film transistor (TFT) array substrate, a counter substrate, and liquid crystal disposed between the TFT array substrate and the counter substrate. The TFT array substrate includes a base member having a light transmissive property and made of quartz, for example, a plurality of pixel electrodes arranged on the base member in a matrix pattern, and TFTs respectively disposed on the pixel electrodes.

JP-A-2013-73181 discloses an array substrate including, between a base member and pixel electrodes, a lens layer filled with a material such as glass or resin in order to increase utilization efficiency of light in the pixel electrodes.

In the array substrate described in JP-A-2013-73181, however, the base member and the lens layer abut each other, and a refractive index of the lens layer is constant in a thickness direction. Therefore, when a difference in light refractive index between the base member and the lens layer is increased, interface reflection between the base member and the lens layer may impair utilization efficiency of light.

SUMMARY

A liquid crystal device according to an aspect of the present disclosure includes a base member that is transmissive, a pixel electrode that is transmissive, a first insulator that is transmissive and that is disposed between the base member and the pixel electrode, and a second insulator that is transmissive and that, in a plan view from a thickness direction of the base member, surrounds the first insulator and abuts the first insulator. The first insulator includes a first portion having a refractive index higher than a refractive index of the second insulator, and a second portion positioned on the base member side of the first portion and having a refractive index lower than the refractive index of the first portion and higher than the refractive index of the second insulator.

DESCRIPTION OF EXEMPLARY EMBODIMENTS

Figure 1:
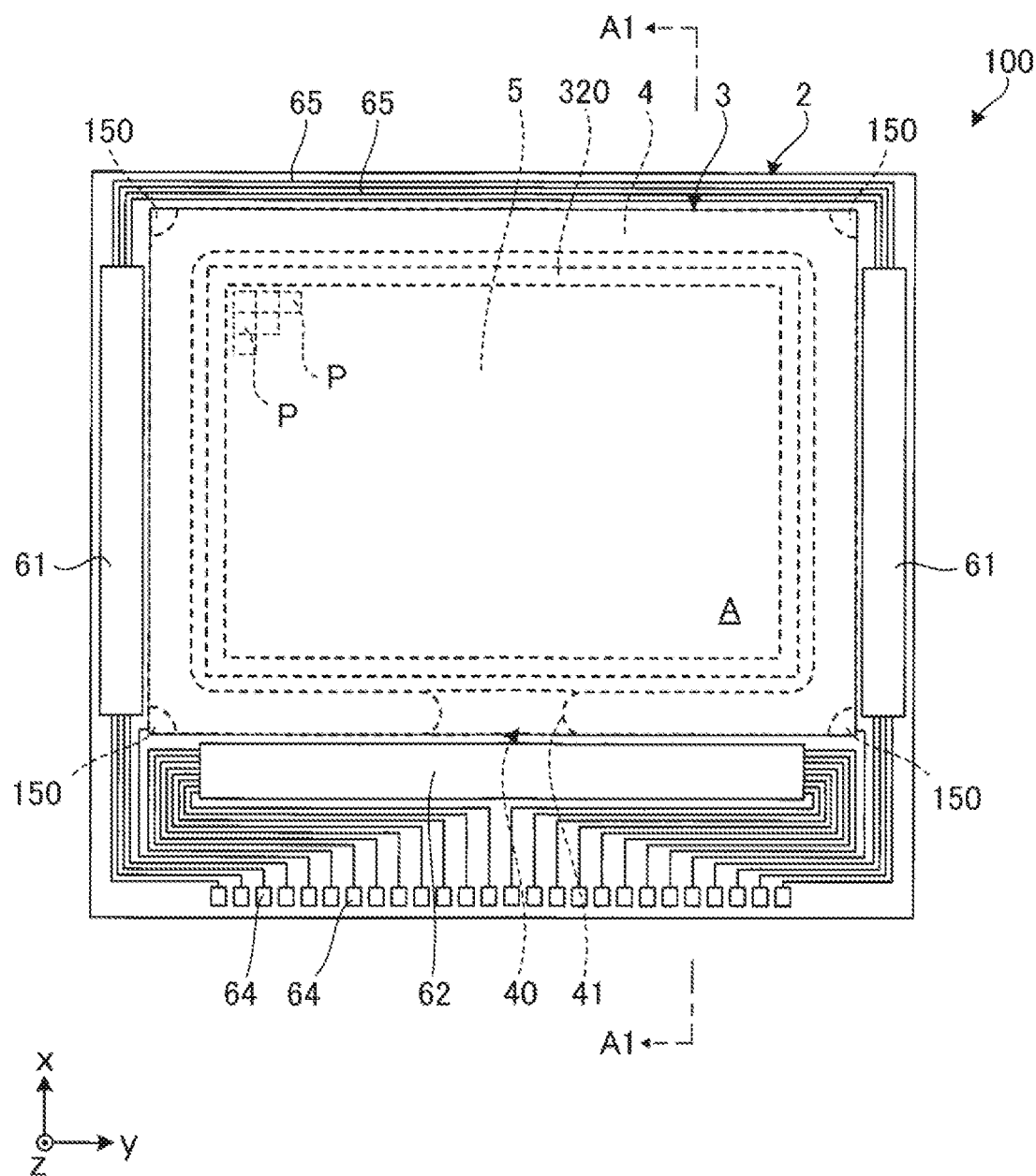
FIG. 1 is a plan view of a liquid crystal device according to a first exemplary embodiment.

Hereinafter, preferred exemplary embodiments of the present disclosure will be described with reference to the accompanying drawings. Note that, in the drawings, dimensions and scales of sections differ from actual dimensions and scales as appropriate, where some sections are also schematically illustrated to make them easily recognizable. Also note that the scope of the present disclosure is not limited to these embodiments unless otherwise stated to limit the present disclosure in the following descriptions. In the specification, the term "parallel" denotes not only a case when two surfaces or lines are fully parallel to each other, but also a case when two surfaces or lines incline one another within a range of ±5°. In the specification, a refractive index denotes an absolute refractive index.

1. Liquid Crystal Device

First, a liquid crystal device according to the present disclosure will be described with reference to, as an example, an active matrix, transmissive-type liquid crystal device including thin film transistors (TFTs) as switching elements. The liquid crystal device can be used favorably as a light modulation device, i.e., a light valve, for a projection-type display apparatus, described later.

1-1. First Exemplary Embodiment

1-1(a). Basic Configuration

Figure 2:
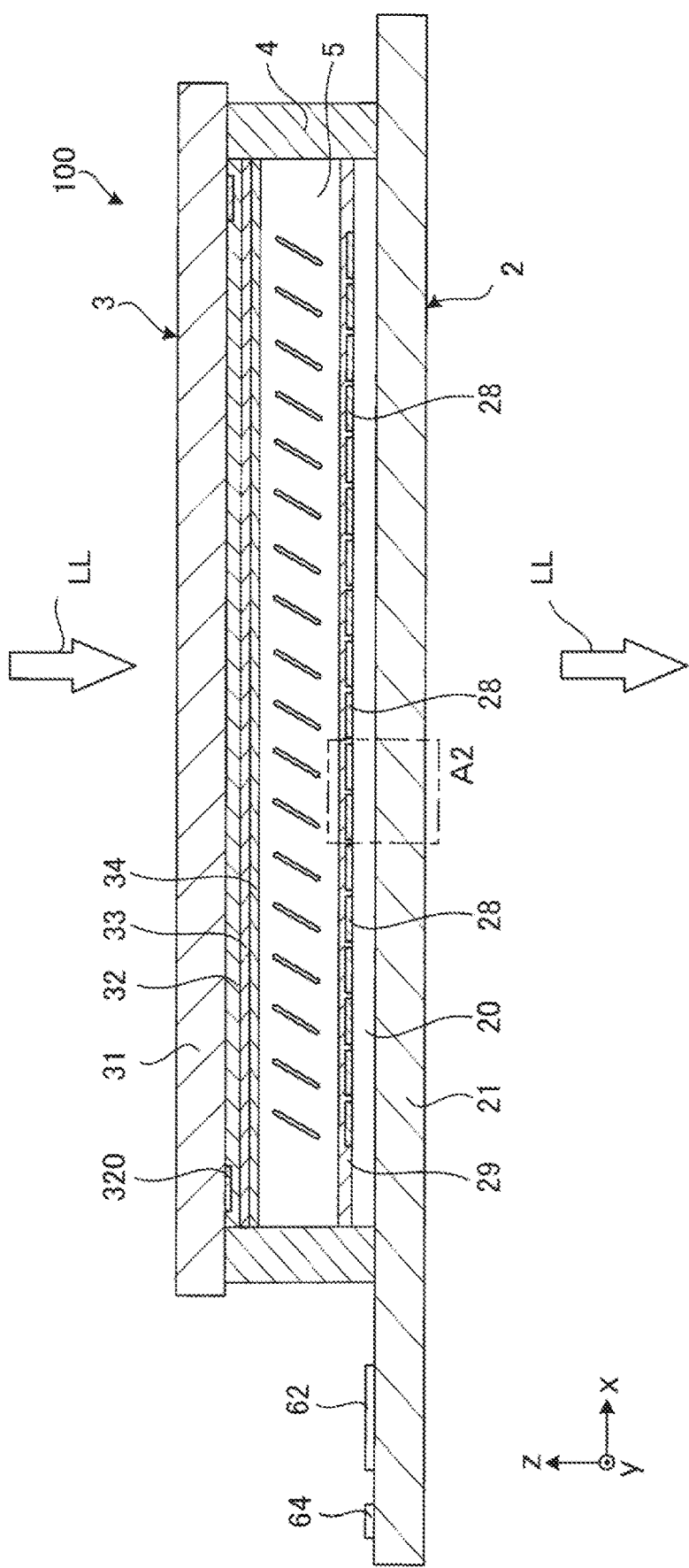
FIG. 2 is a cross-sectional view of the liquid crystal device illustrated in FIG. 1.

FIG. 1 is a plan view of a liquid crystal device according to a first exemplary embodiment. FIG. 2 is a cross-sectional view of the liquid crystal device illustrated in FIG. 1, which is taken along a line A1-A1 in FIG. 1. For convenience of description, herein uses as required an x axis, a y axis, and a z axis orthogonal to one another, as illustrated in FIGS. 1 and 2.

A liquid crystal device 100 illustrated in FIGS. 1 and 2 includes an element substrate 2 having a light transmissive property, a counter substrate 3 having a light transmissive property and arranged to face the element substrate 2, a sealing member 4 having a frame shape and arranged between the element substrate 2 and the counter substrate 3, and a liquid crystal layer 5 surrounded by the element substrate 2, the counter substrate 3, and the sealing member 4. The element substrate 2 is an example of a "first substrate". The counter substrate 3 is an example of a "second substrate". The liquid crystal layer 5 is an example of "liquid crystal".

The liquid crystal device 100 serves as a transmissive-type liquid crystal device. In the exemplary embodiment, as illustrated in FIG. 2, the liquid crystal device 100 causes light LL entering from the counter substrate 3 to exit from the element substrate 2. However, the liquid crystal device 100 may cause the light LL entering from the element substrate 2 to exit from the counter substrate 3. The light LL is visible light. In the specification, a light transmissive property denotes a light transmissive property with respect to visible light, and may denote a transmittance of 50% or higher with respect to visible light. The descriptions below also denote without any distinction, as the light LL, incident light being incident on the liquid crystal device 100, light transmitting through the liquid crystal device 100, and emission light being emitted from the liquid crystal device 100.

As illustrated in FIG. 1, the liquid crystal device 100 has a rectangular shape when viewed in a plan view in a thickness direction of the element substrate 2, i.e., a direction orthogonal to a surface, which faces the counter substrate 3, of the element substrate 2. However, a planar shape of the liquid crystal device 100 is not limited to the rectangular shape and may be a circular shape, for example. As illustrated, the thickness direction of the element substrate 2 is specified to a z-axis direction. The z-axis direction is parallel to an optical axis direction of the light LL.

As illustrated in FIG. 1, the element substrate 2 has a size encompassing the counter substrate 3 when viewed in a plan view. As illustrated in FIG. 2, the element substrate 2 includes a base member 21, a light guide portion 20, a plurality of pixel electrodes 28, and an alignment film 29. The base member 21, the light guide portion 20, the plurality of pixel electrodes 28, and the alignment film 29 are layered together in this order. The alignment film 29 is located closest to the liquid crystal layer 5.

The base member 21 is formed from a flat plate having a light transmissive property and an insulation property. A constituent material of the base member 21 may be a silicon-based inorganic compound, for example. Specifically, the base member 21 is made of glass or quartz, for example. The plurality of pixel electrodes 28 are respectively formed of a transparent conductive material such as indium tin oxide (ITO) or indium zinc oxide (IZO), for example. The alignment film 29 is configured to align liquid crystal molecules in the liquid crystal layer 5. Examples of a constituent material of the alignment film 29 include polyimide and silicon oxide, for example.

Figure 3:
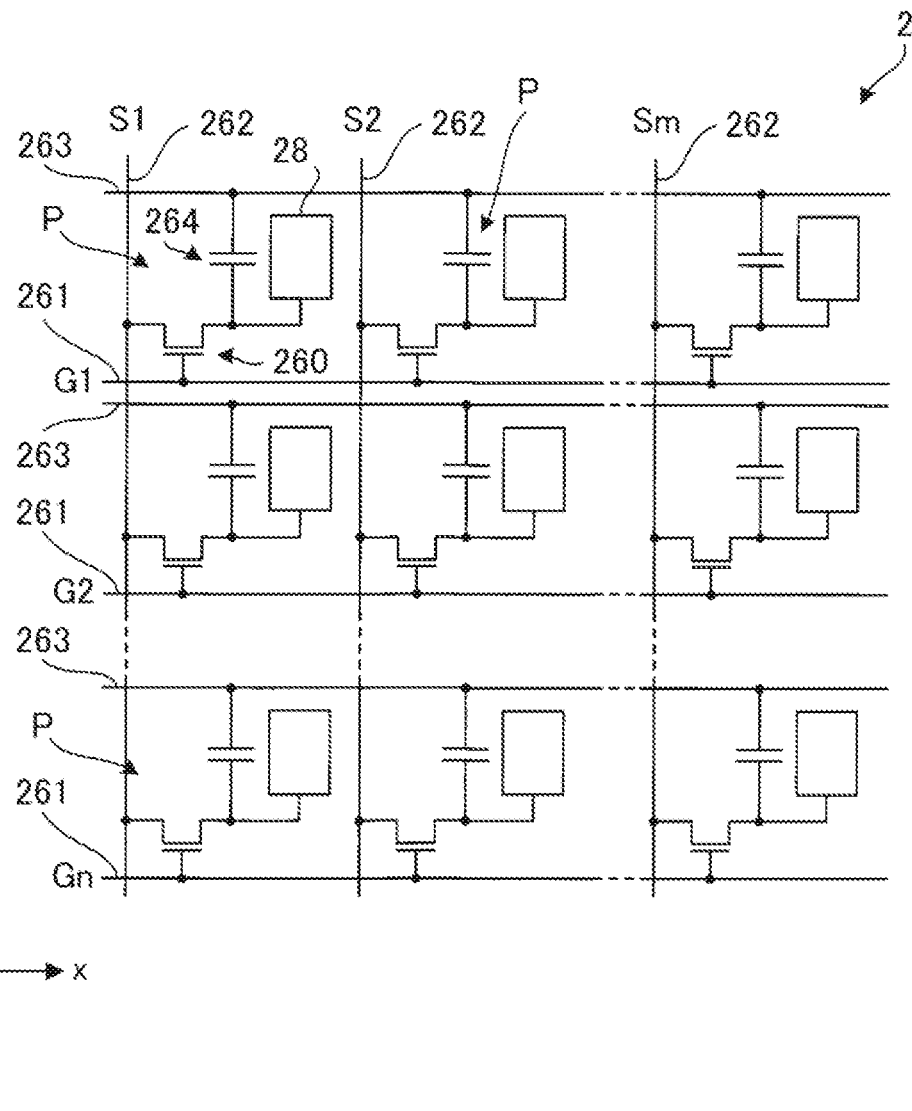
FIG. 3 is an equivalent circuit diagram illustrating an electrical configuration of an element substrate illustrated in FIG. 2.
Figure 4:
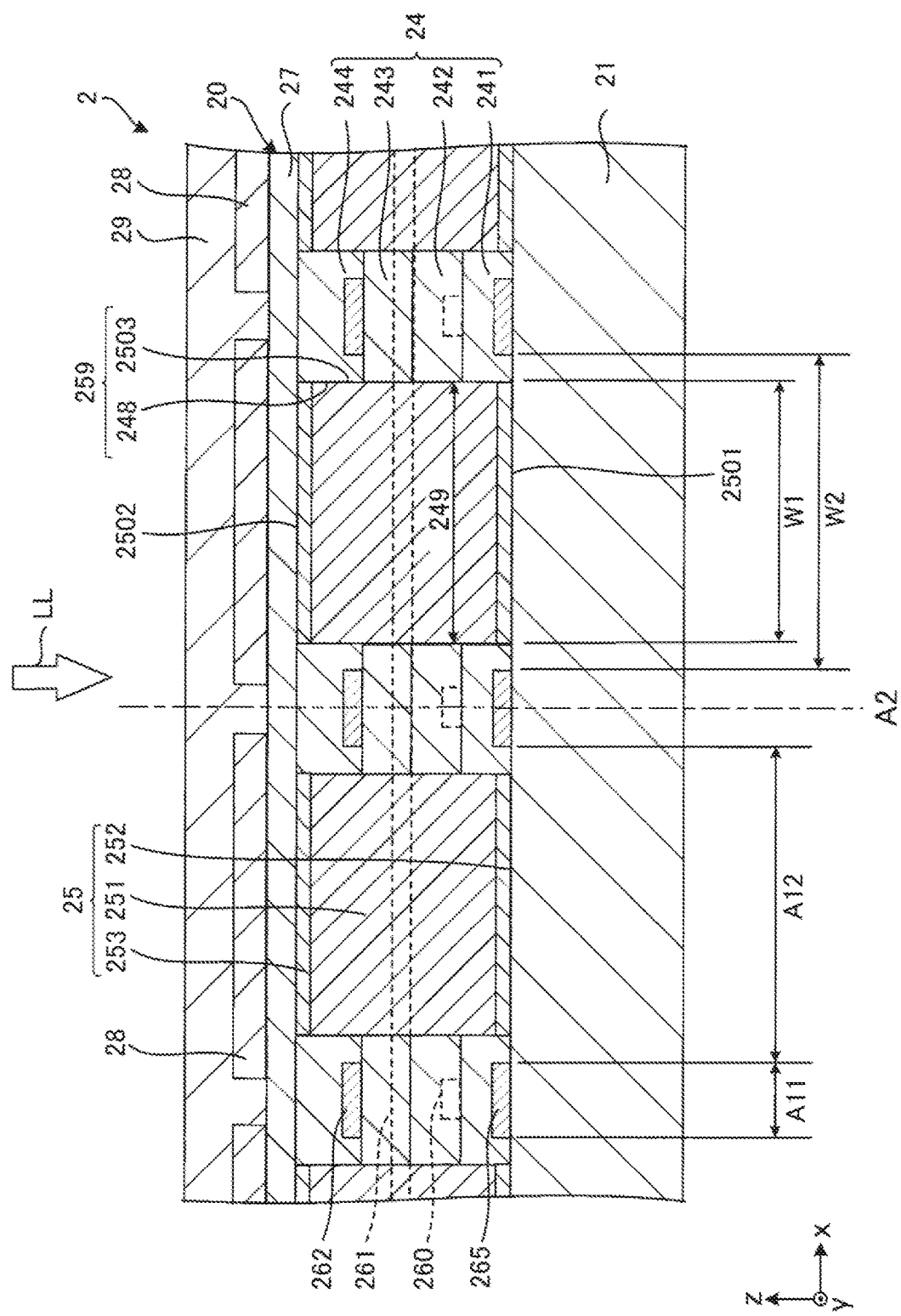
FIG. 4 is an enlarged cross-sectional view of the element substrate illustrated in FIG. 2.

Note that, as will be described later in detail, the light guide portion 20 has a function of guiding the light LL, and includes, as illustrated in FIG. 4, a low refractive index insulator 24, a plurality of high refractive index insulators 25, and a transmissive insulating layer 27. The low refractive index insulator 24 is an example of a "second insulator". The high refractive index insulators 25 are examples of "first insulators". The transmissive insulating layer 27 is an example of a "third insulator". As will be described later in detail, as illustrated in FIG. 3 or 4, the element substrate 2 includes scan lines 261 serving as wires, data lines 262 serving as wires, capacitance lines 263 serving as wires, a light-shielding layer 265, and TFTs 260. The scan lines 261, the data lines 262, the capacitance lines 263, and the light-shielding layer 265 respectively are examples of "light-shielding bodies".

As illustrated in FIG. 2, the counter substrate 3 includes a base member 31, an insulating layer 32, a common electrode 33, and an alignment film 34. The base member 31, the insulating layer 32, the common electrode 33, and the alignment film 34 are layered together in this order. The alignment film 34 is located closest to the liquid crystal layer 5.

The base member 31 is formed from a flat plate having a light transmissive property and an insulation property. The base member 31 is made of glass or quartz, for example. The common electrode 33 is laminated on the base material 31 with the insulating layer 32 therebetween. The common electrode 33 is formed of a transparent conductive material such as ITO or IZO, for example. The alignment film 34 is configured to align the liquid crystal molecules in the liquid crystal layer 5. Examples of a constituent material of the alignment film 34 include polyimide and silicon oxide, for example.

As illustrated in FIGS. 1 and 2, a peripheral partition 320 having a frame shape, which is formed of a metal material having a light shielding property, for example, is disposed inside the sealing member 4 on the counter substrate 3. The peripheral partition 320 is disposed in the insulating layer 32. The peripheral partition 320 internally forms a display region A for displaying images, for example, as illustrated in FIG. 1. The peripheral partition 320 prevents stray light from being incident on the display region A, ensuring high contrast during displaying. The display region A includes a plurality of pixels P arranged in a matrix pattern. Conductive members 150 are provided respectively at four corners of the counter substrate 3 for electrically coupling the element substrate 2 and the counter substrate 3.

The sealing member 4 is formed using an adhesive containing various types of curable resins such as epoxy resin, for example. The sealing member 4 is affixed to both the element substrate 2 and the counter substrate 3. The liquid crystal layer 5 is disposed in a region surrounded by the sealing member 4, the element substrate 2, and the counter substrate 3. An injection port 41 for injecting a liquid crystal material containing liquid crystal molecules is formed on a lower portion of the sealing member 4 in FIG. 1. The injection port 41 is sealed with a sealing member 40 formed using various types of resin materials.

The liquid crystal layer 5 contains the liquid crystal molecules having positive or negative dielectric anisotropy. The liquid crystal layer 5 is interposed between the element substrate 2 and the counter substrate 3 such that the liquid crystal molecules are in contact with both the alignment film 29 and the alignment film 34. The liquid crystal molecules change in alignment in accordance with a voltage applied to the liquid crystal layer 5. A modulation of the light LL in accordance with a voltage to be applied allows the liquid crystal layer 5 to achieve gradation display.

As illustrated in FIG. 1, two scanning line driving circuits 61 and one data line driving circuit 62 are disposed on the surface, which faces the counter substrate 3, of the element substrate 2. In the illustrated example, the two scanning line driving circuits 61 are respectively disposed on a right side and a left side of the element substrate 2 in FIG. 1. The data line driving circuit 62 is disposed on a lower side of the element substrate 2 in FIG. 1. A plurality of external terminals 64 are disposed on an outer peripheral edge portion of the surface, which faces the counter substrate 3, of the element substrate 2. The external terminals 64 are coupled with wirings 65 respectively guided from the scanning line driving circuits 61 and the data line driving circuit 62.

A mode for driving the liquid crystal device 100 may be, but not specifically limited to, a twisted nematic (TN) mode or a vertical alignment (VA) mode, for example.

1-1(b). Electrical Configuration

FIG. 3 is an equivalent circuit diagram illustrating an electrical configuration of the element substrate illustrated in FIG. 2. As illustrated in FIG. 3, the element substrate 2 is formed with n pieces of the scan lines 261, m pieces of the data lines 262, and n pieces of the capacitance lines 263. Note that both n and m are integers of 2 or greater. The TFTs 260 serving as switching elements are respectively provided to correspond to intersections between the n pieces of scan lines 261 and the m pieces of data lines 262. The n pieces of scan lines 261, the m pieces of data lines 262, and the n pieces of capacitance lines 263 are formed of a metal such as aluminum.

The n pieces of scan lines 261 arranged at equal intervals in a y-axis direction extend in an x-axis direction. The scan lines 261 are respectively electrically coupled to gate electrodes of the TFTs 260. The n pieces of scan lines 261 are electrically coupled to the scanning line driving circuits 61 illustrated in FIG. 1. On the n pieces of scan lines 261, scan signals G1, G2, . . . , Gn are line-sequentially supplied from the scanning line driving circuits 61 to the scan lines 261.

The m pieces of data lines 262 arranged at equal intervals in the x-axis direction extend in the y-axis direction. The data lines 262 are respectively electrically coupled to source regions of the TFTs 260. The m pieces of data lines 262 are electrically coupled to the data line driving circuit 62 illustrated in FIG. 1. On the m pieces of data lines 262, image signals S1, S2, . . . , and Sm are line-sequentially supplied from the data line driving circuit 62 to the data lines 262, illustrated in FIG. 1.

The n pieces of scan lines 261 and the m pieces of data lines 262 are insulated from each other and are formed in a grid pattern when viewed in a plan view. A region surrounded by two adjacent of the scan lines 261 and two adjacent of the data lines 262 corresponds to each of the pixels P. The pixels P are respectively formed with the pixel electrodes 28 one by one. Note that drain regions of the TFTs 260 are respectively electrically coupled to the pixel electrodes 28.

The n pieces of capacitance lines 263 arranged at equal intervals in the y-axis direction extend in the x-axis direction. The n pieces of capacitance lines 263 are insulated from the plurality of data lines 262 and the plurality of scan lines 261, and are formed apart from the lines. A fixed potential such as a ground potential is applied to each of the capacitance lines 263. Storage capacitors 264 are respectively provided in parallel to liquid crystal capacitors, between the capacitance lines 263 and the pixel electrodes 28, to prevent leakage of charges held in the liquid crystal capacitors.

When the scan signals G1, G2, . . . , and Gn become sequentially active and the n pieces of scan lines 261 are sequentially selected, the TFTs 260 coupled to the selected scan lines 261 are each turned to an on-state. Then, the image signals S1, S2, . . . , and Sm having magnitudes commensurate with the gradation to be displayed are transmitted, via the m pieces of data lines 262, to the pixels P corresponding to the selected scan lines 261, and are then applied to the pixel electrodes 28. This allows a voltage commensurate with the gradation to be displayed to be applied to the liquid crystal capacitors formed between the pixel electrodes 28 and the common electrode 33 of the counter substrate 3 illustrated in FIG. 2, causing the liquid crystal molecules to vary in alignment in accordance with the applied voltage. The applied voltage is held by the storage capacitors 264. Such a variation in alignment of the liquid crystal molecules causes the light LL to be modulated, achieving gradation display.

1-1(c). Configuration of Element Substrate

Figure 5:
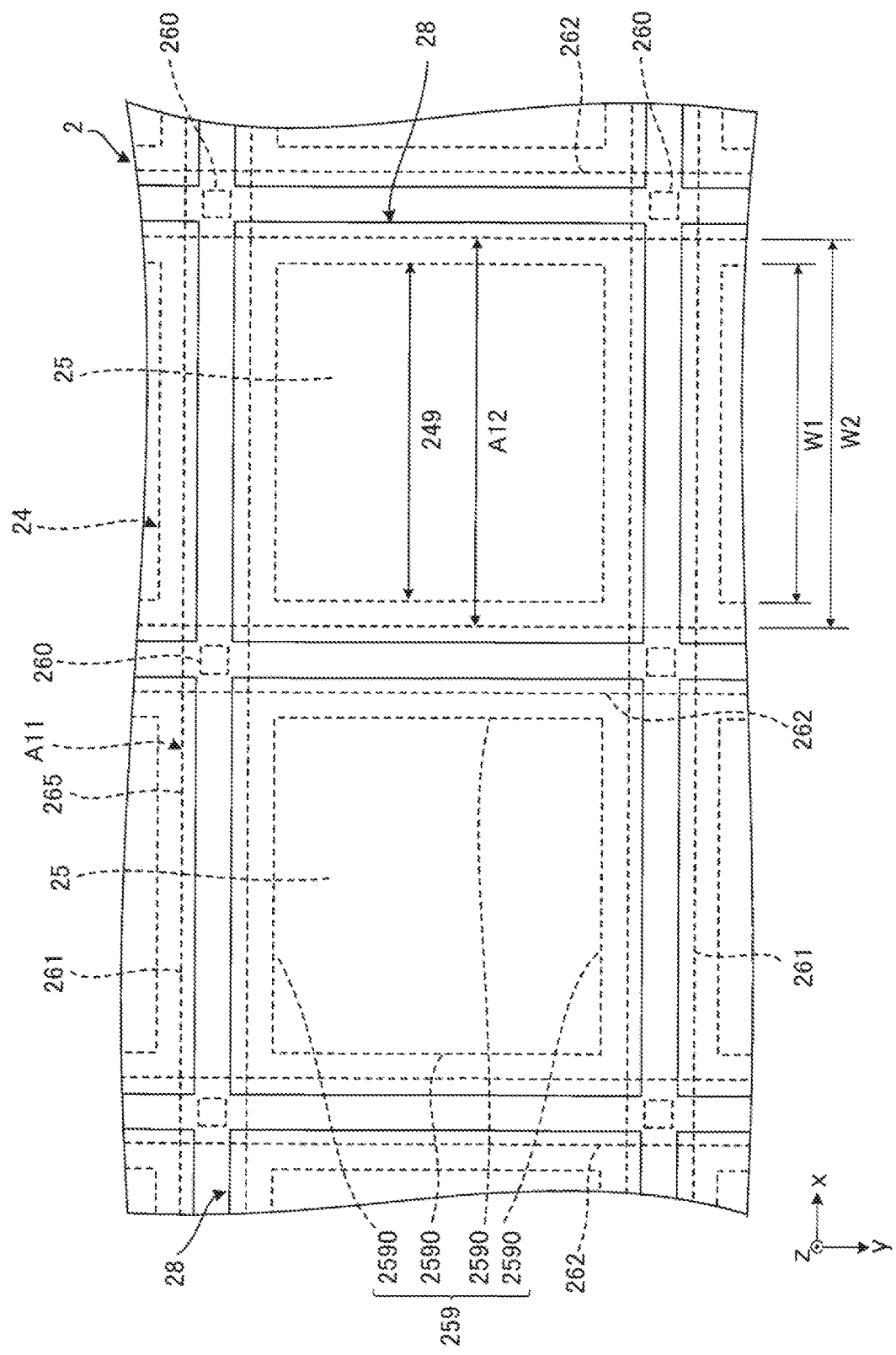
FIG. 5 is a plan view of the element substrate illustrated in FIG. 4.

Next, a detailed configuration of the element substrate 2 will be described below. FIG. 4 is an enlarged cross-sectional view of the element substrate illustrated in FIG. 2. FIG. 5 is a plan view of the element substrate illustrated in FIG. 4. Note that, in FIG. 5, an illustration of the alignment film 29 is omitted.

As described above, the element substrate 2 includes the base member 21, the light-guiding portion 20, the plurality of pixel electrodes 28, the alignment film 29, the scan lines 261, the data lines 262, the capacitance lines 263, the light-shielding layer 265, and the TFTs 260. Note that, in FIG. 4, an illustration of the capacitance lines 263 is omitted. As illustrated in FIG. 4, the light-guiding portion 20 includes the low refractive index insulator 24, the plurality of high refractive index insulators 25 each having a refractive index higher than a refractive index of the low refractive index insulator 24, and the transmissive insulating layer 27.

As illustrated in FIG. 4, the low refractive index insulator 24 is disposed on the base member 21. The low refractive index insulator 24 has a light transmissive property and an insulation property.

As illustrated in FIG. 5, the low refractive index insulator 24 has a grid pattern when viewed in a plan view and has a plurality of through holes 249. The through holes 249 illustrated in FIG. 5 each have a rectangular shape when viewed in a plan view. The shapes of the through holes 249 when viewed in a plan view are the rectangular shapes. Corners of each of the rectangular shapes each form an angle of 90 degrees. However, the corners may be rounded. As illustrated in FIG. 4, the low refractive index insulator 24 is formed with a layered body in which a plurality of interlayer insulating films 241, 242, 243, and 244 are layered together.

A constituent material of the low refractive index insulator 24 may be a silicon-based inorganic compound, and, in particular, may be silicon oxide. Specifically, the interlayer insulating films 241, 242, 243, and 244 are respectively formed from silicon thermal oxide films, or silicon oxide films film-formed through an evaporation method such as a chemical vapor deposition (CVD) method. Note that the interlayer insulating films 241, 242, 243, and 244 may be formed of the same material or different materials.

The TFTs 260, the scan lines 261, the data lines 262, the capacitance lines 263, and the light-shielding layer 265 are disposed on and embedded in the low refractive index insulator 24, and overlap with the low refractive index insulator 24 when viewed in a plan view.

The light-shielding layer 265 illustrated in FIG. 4 has a light-shielding property against the light LL. The light-shielding layer 265 is disposed on the base member 21, and covered by the interlayer insulating film 241. As illustrated in FIG. 5, the light-shielding layer 265 has a grid pattern corresponding to the shape of the low refractive index insulator 24 when viewed in a plan view. Specifically, the light-shielding layer 265 has a plurality of linear shapes along the x-axis direction and a plurality of linear shapes along the y-axis direction when viewed in a plan view. Examples of a constituent material of the light-shielding layer 265 include polysilicon, metal, metal silicide, and a metallic compound. Note that the light-shielding layer 265 does not have a function as wiring in the exemplary embodiment, but the light-shielding layer 265 may have a function as wiring.

As illustrated in FIG. 4, the scan lines 261 each have a light-shielding property against the light LL, are disposed on the interlayer insulating film 242, and are covered by the interlayer insulating film 243. In FIG. 5, the scan lines 261 overlap with the light-shielding layer 265 when viewed in a plan view. Examples of a constituent material of the scan lines 261 include metal, metal silicide, and metal compound, for example.

As illustrated in FIG. 4, the data lines 262 each have a light-shielding property against the light LL, are disposed on the interlayer insulating film 243, and are covered by the interlayer insulating film 244. In FIG. 5, the data lines 262 overlap with the light-shielding layer 265 when viewed in a plan view. Examples of a constituent material of the data lines 262 include metal, metal silicide, and metal compound, for example.

As illustrated in FIG. 4, the TFTs 260 are disposed on the interlayer insulating film 241, and are covered by the interlayer insulating film 242. The TFTs 260 are respectively disposed between the light-shielding layer 265 and the scan lines 261, and respectively overlap with both the data lines 262 and the scan lines 261 when viewed in a plan view. The TFTs 260 overlapping with the data lines 262, the scan lines 261, and the light-shielding layer 265 can block the light LL, preventing or suppressing the light LL from entering into the TFTs 260. Although not illustrated, when a polarizing plate is disposed apart from a surface on a −z-axis side of the element substrate 2, the light LL exiting from the element substrate 2 may enter into the element substrate 2 as return light from the polarizing plate. Even in that case, the light-shielding layer 265 can lower such a possibility that the light LL enters into the TFTs 260.

The scan lines 261, the data lines 262, the capacitance lines 263, and the light-shielding layer 265 configure a light-shielding region A11 having a grid pattern when viewed in a plan view. A plurality of regions surrounded by the light-shielding region A11 when viewed in a plan view configure aperture regions A12 allowing the light LL to pass through. The aperture regions A12 are respectively disposed with the high refractive index insulators 25 and the pixel electrodes 28 when viewed in a plan view. With the scan lines 261, the data lines 262, the capacitance lines 263, and the light-shielding layer 265 disposed and overlapped with each other when viewed in a plan view, a width of the light-shielding region A11 can be decreased, compared with a case when the scan lines 261, the data lines 262, the capacitance lines 263, and the light-shielding layer 265 are neither disposed nor overlapped with each other when viewed in a plan view. Therefore, aperture ratios of the aperture regions A12 can be increased.

As illustrated in FIG. 4, the high refractive index insulators 25 each have a light transmissive property and an insulation property, and are filled in the through holes 249 of the low refractive index insulator 24, described above. The high refractive index insulators 25 do not abut the scan lines 261, the data lines 262, the capacitance lines 263, and the light-shielding layer 265. As illustrated in FIG. 4, a width W1 of each of the high refractive index insulators 25 is smaller than a width W2 of each of the aperture regions A12.

The high refractive index insulators 25 each have a surface 2501 lying adjacent to the base member 21, a surface 2502 lying adjacent to each of the pixel electrodes 28, and side surfaces 2503 coupling the surface 2501 and the surface 2502. The surface 2501 and the surface 2502 are arranged in the z-axis direction. The side surfaces 2503 are surfaces parallel to the z axis, as illustrated. The side surfaces 2503 abut inner wall surfaces 248 defining each of the through holes 249 of the low refractive index insulator 24. The side surfaces 2503 and the inner wall surfaces 248 abutting each other configure an interface 259 between each of the high refractive index insulators 25 and the low refractive index insulator 24.

The refractive index of each of the high refractive index insulators 25 is higher than the refractive index of the low refractive index insulator 24. This allows the light LL entering into the light guide portion 20 to be reflected at the interface 259 between each of the high refractive index insulators 25 and the low refractive index insulator 24, and allows the light LL to be propagated within each of the high refractive index insulators 25. That is, the high refractive index insulators 25 each can function as a waveguide for propagating the light LL.

The interface 259 has a rectangular shape when viewed in a plan view and has four flat surfaces 2590. The flat surfaces 2590 are respectively parallel to a straight line A2 serving as a virtual line extending in the thickness direction of the element substrate 2 illustrated in FIG. 4. The straight line A2 is parallel to a central axis of each of the high refractive index insulators 25.

As illustrated in FIG. 4, the high refractive index insulators 25 each include a high refractive index portion 251, a first medium refractive index portion 252, and a second medium refractive index portion 253. The high refractive index portion 251 is an example of a "first portion". The first medium refractive index portion 252 is an example of a "second portion". The second medium refractive index portion 253 is an example of a "third portion".

The first medium refractive index portion 252 lies on the high refractive index portion 251 so as to be adjacent to the base member 21. The second medium refractive index portion 253 lies on the high refractive index portion 251 so as to be adjacent to the transmissive insulating layer 27. The high refractive index portion 251 is disposed over a wide range expanding in the thickness direction of each of the through holes 249. Specifically, a thickness, i.e., a length in the z-axis direction, of the high refractive index portion 251 shares 90% or more of a thickness of each of the high refractive index insulators 25.

Figure 6:
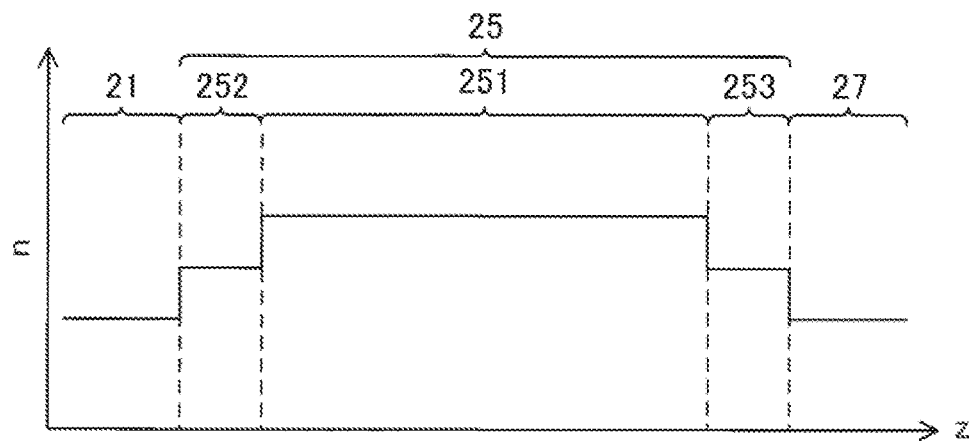
FIG. 6 is a view illustrating distribution of refractive indices in a thickness direction of the element substrate illustrated in FIG. 4.

FIG. 6 is a view illustrating distribution of refractive indices in the thickness direction of each of the high refractive index insulators 25. In FIG. 6, "z" on a horizontal axis represents thickness, while "n" on a vertical axis represents refractive index. As illustrated in FIG. 6, the refractive index of the high refractive index insulators 25 each change stepwise in the thickness direction, i.e., the z-axis direction. Specifically, the refractive index increases stepwise in an order of the base member 21, the first medium refractive index portion 252, and the high refractive index portion 251. The refractive index decreases stepwise in an order of the high refractive index portion 251, the second medium refractive index portion 253, and the transmissive insulating layer 27.

With the first medium refractive index portion 252 disposed between the base member 21 and the high refractive index portion 251, interface reflection can be suppressed between the base member 21 and each of the high refractive index insulators 25. Similarly, with the second medium refractive index portion 253 disposed between the high refractive index portion 251 and the transmissive insulating layer 27, interface reflection can be suppressed between the high refractive index portion 251 and the transmissive insulating layer 27.

As illustrated, the refractive indexes of the first medium refractive index portion 252 and the second medium refractive index portion 253 are identical to each other. However, the refractive indexes may differ from each other. Similarly, the refractive indexes of the base member 21 and the transmissive insulating layer 27 are identical to each other. However, the refractive indexes may differ from each other. A difference in refractive index between the base member 21 and the first medium refractive index portion 252 may be identical to or may differ from a difference in refractive index between the first medium refractive index portion 252 and the high refractive index portion 251. Similarly, a difference in refractive index between the high refractive index portion 251 and the second medium refractive index portion 253 may be identical to or may differ from a difference in refractive index between the second medium refractive index portion 253 and the transmissive insulating layer 27.

A constituent material of the high refractive index insulators 25 may be metal oxide such as aluminum oxide, or silicon-based inorganic compound, for example. In particular, the silicon-based inorganic compound may be preferable.

When the constituent material of the high refractive index insulators 25 is a silicon-based inorganic compound, a content percentage of nitrogen atoms in each of the high refractive index insulators 25 can be adjusted to easily change the refractive index in the thickness direction of each of the high refractive index insulators 25. Specifically, by increasing a content percentage of nitrogen atoms in the high refractive index portion 251 higher than a content percentage of nitrogen atoms in the first medium refractive index portion 252, the refractive index of the high refractive index portion 251 can be increased higher than the refractive index of the first medium refractive index portion 252. Similarly, by increasing the content percentage of the nitrogen atoms in the high refractive index portion 251 higher than a content percentage of nitrogen atoms in the second medium refractive index portion 253, the refractive index of the high refractive index portion 251 can be increased higher than the refractive index of the second medium refractive index portion 253.

Therefore, when the constituent material of the high refractive index insulators 25 is a silicon-based inorganic compound, a constituent material of the high refractive index portion 251 may be either of silicon nitride and silicon oxynitride, while constituent materials of the first medium refractive index portion 252 and the second medium refractive index portion 253 may be silicon oxynitride.

When a silicon-based inorganic compound is used, the refractive indexes of the high refractive index portion 251, the first medium refractive index portion 252, and the second medium refractive index portion 253 can be each adjusted within a range from approximately 1.5 to approximately 1.8 inclusive.

The content percentages of the nitrogen atoms in the high refractive index portion 251, the first medium refractive index portion 252, and the second medium refractive index portion 253 can be adjusted by changing a ratio between oxygen atoms and nitrogen atoms contained in a silicon compound. However, by changing a degree of crystallization on the high refractive index insulators 25, the content percentages of the nitrogen atoms in the high refractive index portion 251, the first medium refractive index portion 252, and the second medium refractive index portion 253 may be adjusted. In this case, silicon compounds having an identical composition may be used to increase a degree of crystallization on the high refractive index portion 251 higher than a degree of crystallization on the first medium refractive index portion 252.

As illustrated in FIG. 4, the transmissive insulating layer 27 having a light transmissive property and an insulation property is disposed on the low refractive index insulator 24 and the high refractive index insulators 25. With the transmissive insulating layer 27, the pixel electrodes 28 can be closely adhered to the low refractive index insulator 24 and the high refractive index insulators 25. As described above, the refractive index of the transmissive insulating layer 27 is lower than the refractive index of each of the high refractive index insulators 25. A constituent material of the transmissive insulating layer 27 may be a silicon-based inorganic compound such as silicon oxide and silicon oxynitride, for example. Specifically, in terms of achieving higher adhesion capability, as described above, the transmissive insulating layer 27 may be formed of glass such as borosilicate glass (BSG), for example. The constituent material of the transmissive insulating layer 27 may be formed of an organic-based compound such as tetraethyl orthosilicate (TEOS), for example.

Note that, as illustrated in FIG. 4, the plurality of pixel electrodes 28 are respectively disposed on the high refractive index insulators 25. Specifically, as illustrated in FIG. 5, the plurality of pixel electrodes 28 are disposed in a matrix pattern when viewed in a plan view, where the pixel electrodes 28 respectively correspond to the high refractive index insulators 25 one by one. The pixel electrodes 28 respectively overlap with the high refractive index insulators 25 when viewed in a plan view, and encompass the high refractive index insulators 25. Note that, as illustrated in FIG. 4, the alignment film 29 is disposed on the plurality of pixel electrodes 28.

1-1(d). Optical Path in Element Substrate

Figure 7:
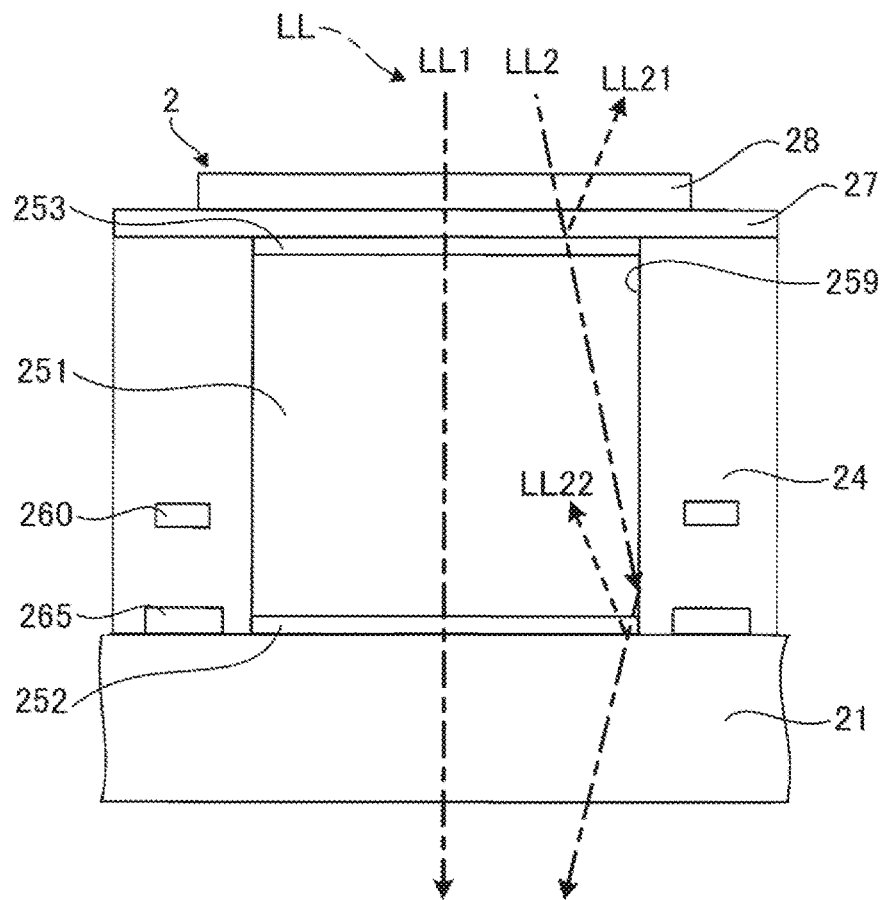
FIG. 7 is a schematic diagram for explaining light transmitting through the element substrate illustrated in FIG. 4.

Next, the optical path in the element substrate 2 will be described below. FIG. 7 is a schematic diagram for explaining light transmitting through the element substrate illustrated in FIG. 4.

As illustrated in FIG. 7, after being incident on each of the high refractive index insulators 25, a light beam LL1 of the light LL extends parallel to the optical axis of the light LL, keeps traveling straight, and then exits from each of the high refractive index insulators 25 without being reflected by the interface 259.

On the other hand, for example, a light beam LL2 of the light LL inclines relative to the optical axis. When the light beam LL2 once enters into each of the high refractive index insulators 25, the light beam LL2 reaches the interface 259. The light beam LL2 is then totally reflected by the interface 259 under a relationship between the refractive index of each of the high refractive index insulators 25 and the refractive index of the low refractive index insulator 24. For example, here assumes a case where the low refractive index insulator 24 is formed of silicon oxide and the high refractive index insulators 25 are formed of silicon oxynitride, and the refractive index of the low refractive index insulator 24 is 1.46 and the refractive index of each of the high refractive index insulators 25 is 1.64 with respect to visible light having a wavelength of 550 nm. In this case, an incident angle with respect to the interface 259 is greater than or equal to 62°, which results in total reflection by the interface 259 due to the Snell's law. Therefore, as illustrated, the light beam LL2 is totally reflected by the interface 259. The light beam LL2 then travels toward the inside of each of the high refractive index insulators 25, and exits from each of the high refractive index insulators 25. With the interface 259 configured to totally reflect the light beam LL2, the light beam LL2 can be prevented from entering into the low refractive index insulator 24.

With the high refractive index insulators 25 each including the second medium refractive index portion 253, such interface reflection as a light beam LL21 illustrated with a dashed line in FIG. 7 can be suppressed or prevented from occurring between the transmissive insulating layer 27 and each of the high refractive index insulators 25. Similarly, with the high refractive index insulators 25 each including the first medium refractive index portion 252, such interface reflection as a light beam LL22 illustrated with another dashed line in FIG. 7 can be suppressed or prevented from occurring between the base member 21 and each of the high refractive index insulators 25.

In the liquid crystal device 100, as described above, the element substrate 2 includes the base member 21 having a light transmissive property, and the pixel electrodes 28 having a light transmissive property and lying closer to the liquid crystal layer 5 than the base member 21. The element substrate 2 further includes the high refractive index insulators 25 each having a light transmissive property and each disposed between the base member 21 and each of the pixel electrodes 28, and the low refractive index insulator 24 having a light transmissive property and surrounding and abutting the high refractive index insulators 25 in the thickness direction of the element substrate 2 when viewed in a plan view. The high refractive index insulators 25 are examples of the "first insulators". The low refractive index insulator 24 is an example of the "second insulator". The high refractive index insulators 25 each include the high refractive index portion 251 serving as the "first portion" having the refractive index higher than the refractive index of the low refractive index insulator 24, and the first medium refractive index portion 252 serving as the "second portion" lying closer to the base member 21 than the high refractive index portion 251 and having the refractive index lower than the refractive index of the high refractive index portion 251, but higher than the refractive index of the low refractive index insulator 24.

With the liquid crystal device 100, where the high refractive index insulators 25 each include the first medium refractive index portion 252, interface reflection due to a difference in refractive index between the base member 21 and each of the high refractive index insulators 25 can be suppressed, compared with a case when the high refractive index insulators 25 do not each include the first medium refractive index portion 252. Therefore, a reduction in light transmittance can be suppressed.

With the refractive index of each of the high refractive index insulators 25 higher than the refractive index of the low refractive index insulator 24, the interface 259 can reflect the light LL, suppressing the light LL from entering into the low refractive index insulator 24. Therefore, the light LL entering into each of the high refractive index insulators 25 can effectively pass through and exit from each of the high refractive index insulators 25, further suppressing a reduction in light transmittance. Suppressing the light LL from entering into the low refractive index insulator 24 can suppress the light LL from entering into the TFTs 260 disposed in the low refractive index insulator 24. Therefore, such an erroneous operation due to a leakage current from any of the TFTs 260 can be suppressed.

Further, as described above, with the low refractive index insulator 24 having an insulation property, the scan lines 261, the data lines 262, and the capacitance lines 263 can be arranged within the low refractive index insulator 24 without allowing short-circuiting from occurring. If components equivalent to the low refractive index insulator 24 and the high refractive index insulators 25 are formed using a non-insulating material such as AlGaAs, for example, another material is required to insulate the scan lines 261, the data lines 262, and the capacitance lines 263 from one another. In contrast, with the low refractive index insulator 24 and the high refractive index insulators 25 each having an insulation property, such another material as described above is not required. This allows the configuration of the light guide portion 20 to be simplified.

With the low refractive index insulator 24 and the high refractive index insulators 25 where the constituent materials are inorganic compounds, durability can be improved, compared with a case when organic compounds are used as the constituent materials.

Note that the low refractive index insulator 24 and the high refractive index insulators 25 configured as illustrated can be formed with a method described below, for example. First, a plurality of layers formed of a silicon compound containing silicon oxide, for example, are film-formed through a CVD method on the base member 21. After that, patterning is performed by dry etching with etching gas in which halogen-based gas, such as fluorine, is mixed with oxygen or carbon monoxide to form the through holes 249. The low refractive index insulator 24 is thus formed. Next, the through holes 249 of the low refractive index insulator 24 are filled with a silicon compound containing silicon oxynitride, for example. After the through holes 249 are filled with the compound, the high refractive index insulators 25 are formed. With the method described above, the high refractive index insulators 25 respectively having simple structures and functioning as waveguides can be formed.

The high refractive index insulators 25 can be each acquired by sequentially forming a layer constituting the first medium refractive index portion 252, a layer constituting the high refractive index portion 251, and a layer constituting the second medium refractive index portion 253, for example. For the high refractive index insulators 25, film-formation conditions may be adjusted, and a single film-formation device, for example, may be used to successively form the first medium refractive index portion 252, the high refractive index portion 251, and the second medium refractive index portion 253.

As described above, each of the constituent materials of the high refractive index insulators 25 and the low refractive index insulator 24 may be silicon-based inorganic compounds containing at least either of oxygen atoms and nitrogen atoms. Further, the content percentage of the nitrogen atoms in the first medium refractive index portion 252 may be lower than the content percentage of the nitrogen atoms in the high refractive index portion 251, but higher than the content percentage of the nitrogen atoms in the low refractive index insulator 24.

By using a silicon-based inorganic compound, the low refractive index insulator 24, and the high refractive index insulators 25 having the refractive index higher than the refractive index of the low refractive index insulator 24 can be easily formed. By using a silicon-based inorganic compound, the refractive index of each of the high refractive index insulators 25 each including the first medium refractive index portion 252 and the high refractive index portion 251 can be easily and precisely be adjusted.

As described above, the element substrate 2 includes the transmissive insulating layer 27 having a light transmissive property and serving as the "third insulator" disposed between each of the high refractive index insulators 25 and the pixel electrodes 28. The high refractive index insulators 25 each further include the second medium refractive index portion 253 serving as the "third portion" lying closer to the transmissive insulating layer 27 than the high refractive index portion 251 and having the refractive index lower than the refractive index of the high refractive index portion 251, but higher than the refractive index of the low refractive index insulator 24.

With the transmissive insulating layer 27, the pixel electrodes 28 can be closely adhered to the high refractive index insulators 25 and the low refractive index insulator 24. Flatness of a surface on a +z-axis side of each of the pixel electrodes 28, i.e., a degree of parallelization on the surface on the +z-axis side of each of the pixel electrodes 28 with respect to an x-y flat surface, can be improved. With the high refractive index insulators 25 each including the second medium refractive index portion 253, interface reflection due to a difference in refractive index between the transmissive insulating layer 27 and each of the high refractive index insulators 25 can be suppressed, compared with a case when the second medium refractive index portion 253 is not provided. Therefore, a reduction in light transmittance can further be suppressed.

Although not illustrated, a layer having a light transmissive property, an insulation property, and a refractive index lower than the refractive index of each of the pixel electrodes 28, but higher than the refractive index of the transmissive insulating layer 27 may be provided between the transmissive insulating layer 27 and each of the pixel electrodes 28. With the layer, interface reflection between the transmissive insulating layer 27 and each of the pixel electrodes 28 can be suppressed. Therefore, a reduction in light transmittance can further be suppressed in the element substrate 2.

As described above, the element substrate 2 further includes the TFTs 260 serving as switching elements, as well as further includes the scan lines 261, the data lines 262, and the light-shielding layer 265 disposed and overlapped with the TFTs 260 that are examples of the switching elements when viewed in a plan view.

With the scan lines 261, the data lines 262, and the light-shielding layer 265 overlapping with the TFTs 260 when viewed in a plan view, the light LL can be suppressed or prevented from entering into the TFTs 260. In the exemplary embodiment, the scan lines 261, the data lines 262, and the light-shielding layer 265 respectively serve as "light-shielding bodies", and all overlap with the TFTs 260. However, any of the scan lines 261, the data lines 262, and the light-shielding layer 265 may not overlap with the TFTs 260. At least one kind of the scan lines 261, the data lines 262, the capacitance lines 263 and the light-shielding layer 265 may serve as the "light-shielding bodies".

The scan lines 261, the data lines 262, and the light-shielding layer 265 are disposed apart from each of the high refractive index insulators 25, and thus do not abut each of the high refractive index insulators 25. In a case where the light-shielding layer 265 is provided to abut each of the high refractive index insulators 25, the light LL reflected by an edge of the light-shielding layer 265 may be reflected diffusely due to an irregular reflection direction and may enter into the low refractive index insulator 24. In contrast, the light-shielding layer 265 does not abut each of the high refractive index insulators 25, and thus the light LL can be prevented from being reflected diffusely by an end surface of the light-shielding layer 265. Therefore, the light LL can be more efficiently prevented from entering into the TFTs 260.

As illustrated in FIG. 4, the high refractive index insulators 25 are disposed almost over a whole range in the z-axis direction of the low refractive index insulator 24. The above arrangement allows the function as a waveguide to be more effectively exerted than a case where the high refractive index insulators 25 are disposed in only a part of a range in the z-axis direction of the low refractive index insulator 24. Such a possibility that the light LL enters into the TFTs 260 can also be lowered. The high refractive index insulators 25 may not be fully disposed on the through holes 249 of the low refractive index insulator 24, but may be disposed to partially fill the through holes 249.

The low refractive index insulator 24 surrounds the side surfaces 2503 of each of the high refractive index insulators 25 when viewed in a plan view. Therefore, the low refractive index insulator 24 can significantly present a function as a waveguide for each of the high refractive index insulators 25, compared with a case when the side surfaces 2503 of each of the high refractive index insulators 25 are not surrounded when viewed in a plan view.

As for the liquid crystal device 100 according to the exemplary embodiment, the flat surfaces 2590 configuring the interface 259 may be curved surfaces or have steps instead of being planes, as long as functions of the high refractive index insulators 25 as waveguides are not inhibited. The flat surfaces 2590 may be inclined relative to the straight line A2.

In the exemplary embodiment, the through holes 249 of the low refractive index insulator 24 may each form a plan-view shape such as a rectangular shape with curved sides or a rectangular shape with opposing two sides being not parallel to each other. Similarly, the interface 259 may form a plan-view shape such as a rectangular shape with curved sides or a rectangular shape with opposing two sides being not parallel to each other, as long as functions of the high refractive index insulators 25 as waveguides are not inhibited.

The pixel electrodes 28 respectively accommodate the high refractive index insulators 25 when viewed in a plan view in the exemplary embodiment, but may not respectively accommodate the high refractive index insulators 25 when viewed in a plan view, for example, as long as the pixel electrodes 28 overlap with at least some of the high refractive index insulators 25 when viewed in a plan view.

In the exemplary embodiment, the transmissive insulating layer 27 is disposed between the high refractive index portion 251 and the pixel electrodes 28. However, the transmissive insulating layer 27 may be omitted. In this case, the high refractive index insulators 25 and the pixel electrodes 28 may directly abut each other.

In the exemplary embodiment, the high refractive index insulators 25 each include the second medium refractive index portion 253. However, the second medium refractive index portion 253 may be omitted.

The element substrate 2 may include other wires than, for example, the scan lines 261, the data lines 262, and the capacitance lines 263. A number of laminated layers and an order of laminated layers for the wires included in the element substrate 2 are not limited to the illustrated example, but may be selected as desired. The element substrate 2 may include another layer having a light-shielding property than the light-shielding layer 265. In the exemplary embodiment, the light-shielding layer 265 is disposed on each of the TFTs 260 to lie adjacent to the base member 21. However, the light-shielding layer 265 may be disposed on each of the TFTs 260 to lie adjacent to the liquid crystal layer 5. In the exemplary embodiment, the scan lines 261, the data lines 262, the capacitance lines 263, and the light-shielding layer 265 are respectively disposed in the low refractive index insulator 24. However, some of the scan lines 261, the data lines 262, the capacitance lines 263, and the light-shielding layer 265 respectively may abut or may not abut the high refractive index insulators 25.

The number of laminated layers in the low refractive index insulator 24 may be freely determined without being limited to the illustrated example.

1-2. Second Exemplary Embodiment

Figure 8:
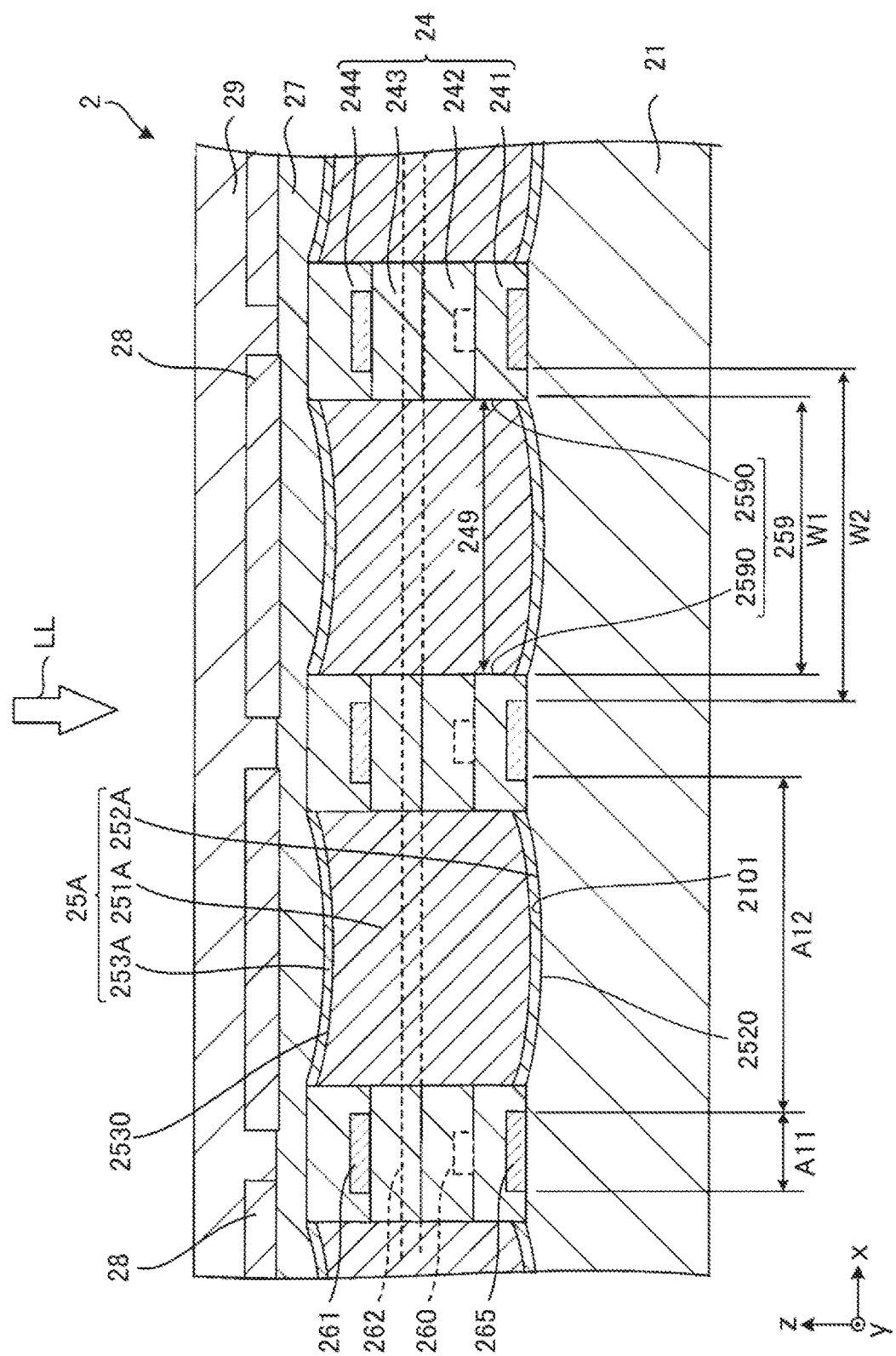
FIG. 8 is an enlarged cross-sectional view of an element substrate according to a second exemplary embodiment.
Figure 9:
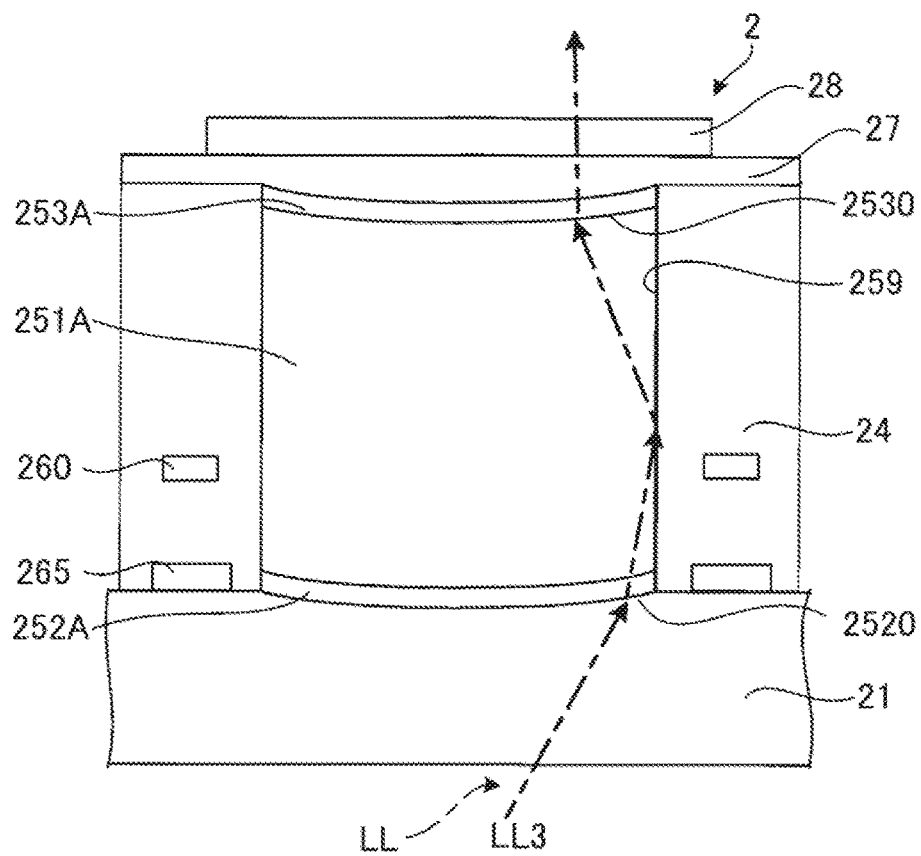
FIG. 9 is a schematic diagram for explaining light transmitting through the element substrate illustrated in FIG. 8.

Next, a second exemplary embodiment of the present disclosure will be described below. FIG. 8 is an enlarged cross-sectional view of an element substrate used in the second exemplary embodiment. FIG. 9 is a schematic diagram for explaining light transmitting through the element substrate illustrated in FIG. 8.

The exemplary embodiment is identical to the first exemplary embodiment except that high refractive index insulators mainly differ in configuration. Note that, in the descriptions below, the second exemplary embodiment will be described by focusing on differences from the first exemplary embodiment, and descriptions of similar matters will be omitted. The same configurations as those in the first exemplary embodiment are provided with the same reference signs in FIGS. 8 and 9. In the exemplary embodiment, such a case will be described that the light LL enters from the element substrate 2, passes through the liquid crystal layer 5, and exits from the counter substrate 3.

High refractive index insulators 25A included in an element substrate 2A illustrated in FIG. 8 each include a high refractive index portion 251A serving as a "first portion", a first medium refractive index portion 252A serving as a "second portion" and lying on the high refractive index portion 251A so as to be adjacent to a base member 21A, and a second medium refractive index portion 253A serving as a "third portion" and lying on high refractive index portion 251A so as to be adjacent to a transmissive insulating layer 27A.

Note that the base material 21A has a plurality of recessed portions 210 being arranged in a matrix pattern when viewed in a plan view and recessed in a hemispherical shape. A surface, which lies adjacent to the base member 21A, of each of the high refractive index insulators 25A is formed as a convex lens surface 2520 that is a hemispherical convex surface corresponding in shape to the concave portion 210. A surface, which lies adjacent to the transmissive insulating layer 27A, of each of the high refractive index insulators 25A is formed as a concave lens surface 2530 that is a hemisphere concave surface.

As illustrated in FIG. 9, for example, a light beam LL3 inclined relative to the optical axis is refracted by the concave lens surface 2520 toward the interface 259, reflected by the interface 259, and refracted again by the convex lens surface 2530. The light beam LL3 exits in parallel to the optical axis. Therefore, the light LL exiting from the element substrate 2A can be suppressed from being concentrated. The light LL exits from the element substrate 2A in parallel to the optical axis, reducing diagonal components of the light LL passing through the liquid crystal layer 5. Therefore, utilization efficiency of the light LL can be increased while suppressing a decrease in reliability on resistance against light due to deterioration of the liquid crystal molecules.

Even the exemplary embodiment can increase the utilization efficiency of the light LL, similar to the first exemplary embodiment.

1-3. Third Exemplary Embodiment

Figure 10:
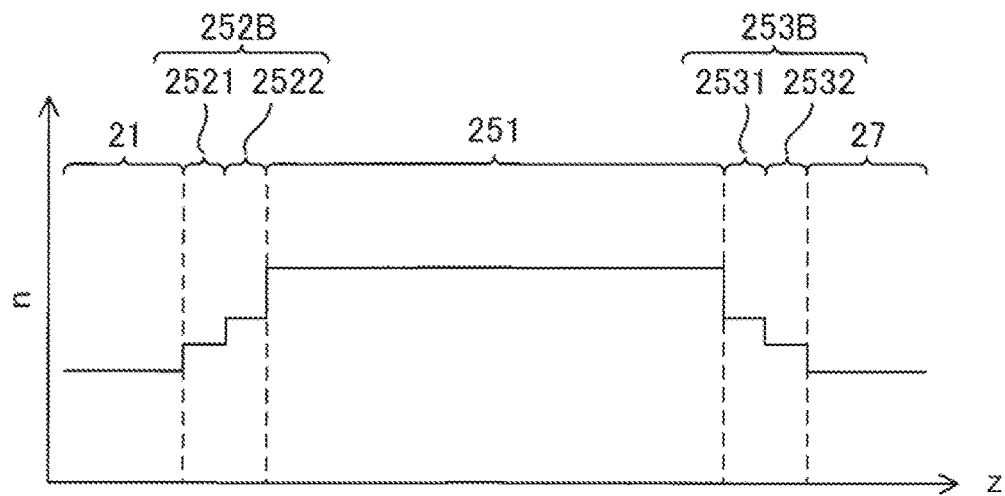
FIG. 10 is a view illustrating distribution of refractive indices in the thickness direction of an element substrate used in a third exemplary embodiment.

Next, a third exemplary embodiment of the present disclosure will be described below. FIG. 10 is a view illustrating distribution of refractive indices in the thickness direction of an element substrate according to the third exemplary embodiment.

The exemplary embodiment is identical to the first exemplary embodiment except that first medium refractive index portions and second medium refractive index portions mainly differ in configuration. Note that, in the descriptions below, the third exemplary embodiment will be described by focusing on differences from the first exemplary embodiment, and descriptions of similar matters will be omitted. In FIG. 10, the same reference numbers are given to the same configurations as in the first exemplary embodiment.

As illustrated in FIG. 10, a first medium refractive index portion 252B serving as a "second portion" includes two layers 2521 and 2522 respectively having refractive indexes different from each other, and a second medium refractive index portion 253B serving as a "third portion" includes two layers 2531 and 2532 respectively having refractive indexes different from each other.

The refractive index of the layer 2522 is greater than the refractive index of the layer 2521. In the first medium refractive index portion 252B, the refractive index increases stepwise from the base member 21 toward the high refractive index portion 251. With the first medium refractive index portion 252B having the refractive index that changes stepwise, the refractive index can further be suppressed from sharply changing, compared with a case when the refractive index of the first medium refractive index portion 252B is constant. A content percentage of nitrogen atoms in the first medium refractive index portion 252B increases stepwise from the base member 21 toward the high refractive index portion 251. With the content percentage of the nitrogen atoms, which changes stepwise, the first medium refractive index portion 252B having the refractive index that changes stepwise can be easily formed.

Similarly, a refractive index of the layer 2532 is smaller than the refractive index of the layer 2531. In the second medium refractive index portion 253B, the refractive index decreases stepwise from the high refractive index portion 251 toward the transmissive insulating layer 27. With the second medium refractive index portion 253B having the refractive index that changes stepwise, the refractive index can further be suppressed from sharply changing, compared with a case when the refractive index of the second medium refractive index portion 253B is constant. With the first medium refractive index portion 252B and the second medium refractive index portion 253B, a reduction in light transmittance due to interface reflection in the element substrate 2 can be particularly suppressed. A content percentage of nitrogen atoms in the second medium refractive index portion 253B decreases stepwise from the high refractive index portion 251 toward the transmissive insulating layer 27. With the content percentage of the nitrogen atoms, which changes stepwise, the second medium refractive index portion 253B having the refractive index that changes stepwise can be easily formed.

Each of numbers of layers in the first medium refractive index portion 252B and the second medium refractive index portion 253B are not limited to two, but may be three or more. The first medium refractive index portion 252B and the second medium refractive index portion 253B are not limited to each have a configuration including a plurality of layers, but may each have a configuration including a layer having a refractive index that changes stepwise.

Even the exemplary embodiment can increase the utilization efficiency of the light LL, similar to the first exemplary embodiment.

1-4. Fourth Exemplary Embodiment

Figure 11:
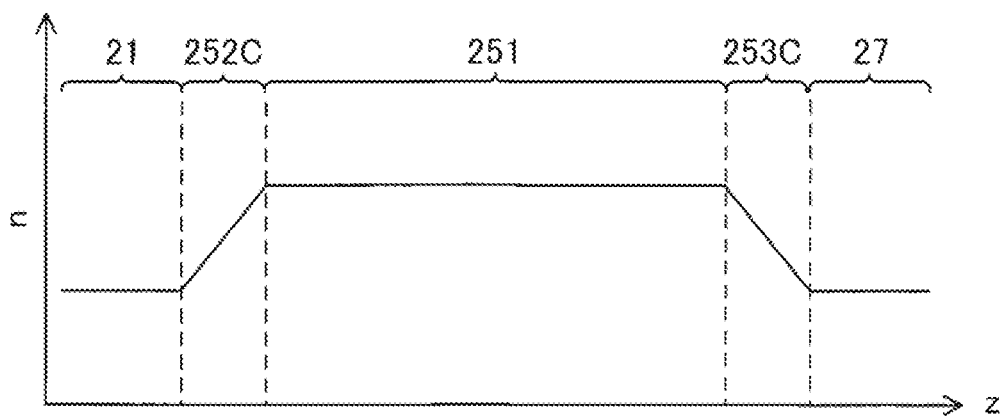
FIG. 11 is a view illustrating distribution of refractive indices in the thickness direction of an element substrate used in a fourth exemplary embodiment.

Next, a fourth exemplary embodiment of the present disclosure will be described below. FIG. 11 is a view illustrating distribution of refractive indices in the thickness direction of an element substrate according to the fourth exemplary embodiment.

The exemplary embodiment is identical to the first exemplary embodiment except that first medium refractive index portions and second medium refractive index portions mainly differ in configuration. Note that, in the descriptions below, the fourth exemplary embodiment will be described by focusing on differences from the first exemplary embodiment, and descriptions of similar matters will be omitted. In FIG. 11, the same reference numbers are given to the same configurations as in the first exemplary embodiment.

As illustrated in FIG. 11, a refractive index of a first medium refractive index portion 252C serving as a "second portion" and a refractive index of a second medium refractive index portion 253C serving as a "third portion" respectively continuously change.

The refractive index of the first medium refractive index portion 252C continuously increases at a constant rate of change from the base member 21 toward the high refractive index portion 251. A content percentage of nitrogen atoms in the first medium refractive index portion 252C continuously increases at a constant rate of change from the base member 21 toward the high refractive index portion 251. With the first medium refractive index portion 252C having the refractive index that continuously changes, the refractive index can be suppressed from sharply changing, compared with a case when the refractive index of the first medium refractive index portion 252C is constant. In particular, as the first medium refractive index portion 252C has the refractive index that increases at a constant rate of change, the refractive index can be suppressed from sharply changing, compared with a case when the refractive index does not increase at a constant rate of change.

Similarly, the refractive index of the second medium refractive index portion 253C continuously decreases at a constant rate of change from the high refractive index portion 251 toward the transmissive insulating layer 27. A content percentage of nitrogen atoms in the first medium refractive index portion 252C continuously decreases at a constant rate of change from the high refractive index portion 251 toward the transmissive insulating layer 27. With the second medium refractive index portion 253C having the refractive index that continuously changes, the refractive index can be suppressed from sharply changing, compared with a case when the refractive index of the second medium refractive index portion 253C is constant. In particular, as the second medium refractive index portion 253C has the refractive index that decreases at a constant rate of change, the refractive index can be suppressed from sharply changing, compared with a case when the refractive index does not decrease at a constant rate of change.

Even the exemplary embodiment can increase the utilization efficiency of the light LL, similar to the first exemplary embodiment.

1-5. Fifth Exemplary Embodiment

Figure 12:
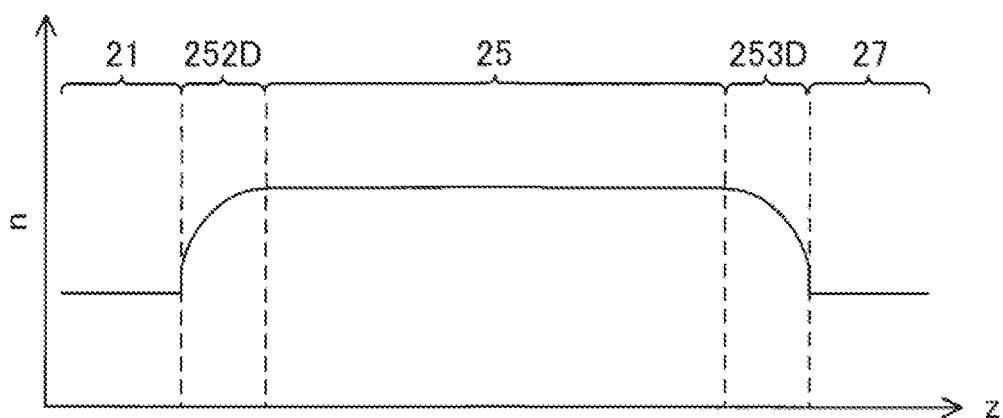
FIG. 12 is a view illustrating distribution of refractive indices in the thickness direction of an element substrate used in a fifth exemplary embodiment.

Next, a fifth exemplary embodiment of the present disclosure will be described below. FIG. 12 is a view illustrating distribution of refractive indices in the thickness direction of an element substrate according to the fifth exemplary embodiment.

The exemplary embodiment is identical to the fourth exemplary embodiment except that first medium refractive index portions and second medium refractive index portions mainly differ in configuration. Note that, in the descriptions below, the fifth exemplary embodiment will be described by focusing on differences from the fourth exemplary embodiment, and descriptions of similar matters will be omitted. In FIG. 12, the same reference numbers are given to the same configurations as in the fourth exemplary embodiment.

As illustrated in FIG. 12, a refractive index of a first medium refractive index portion 252D serving as a "second portion" continuously increases from the base member 21 toward the high refractive index portion 251, even though a rate of change is not constant. Similarly, a refractive index of a second medium refractive index portion 253D serving as a "third portion" continuously decreases from the high refractive index portion 251 toward the transmissive insulating layer 27, even though a rate of change is not constant. With the first medium refractive index portion 252D, the refractive index can be suppressed from sharply changing, compared with a case when the refractive index is constant. Similarly, with the second medium refractive index portion 253D, the refractive index can be suppressed from sharply changing, compared with a case when the refractive index is constant.

1-6. Sixth Exemplary Embodiment

Figure 13:
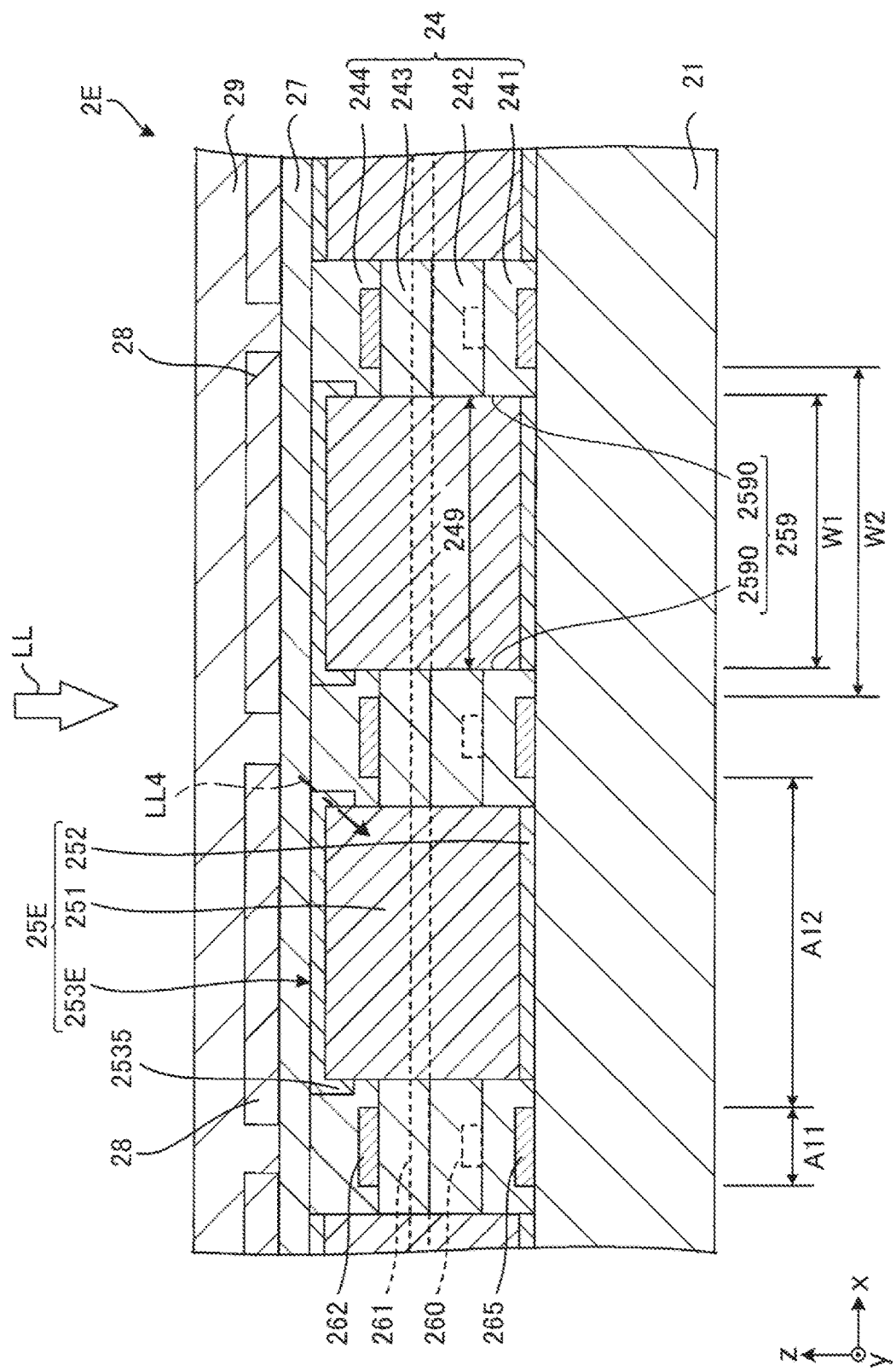
FIG. 13 is an enlarged cross-sectional view of an element substrate used in a sixth exemplary embodiment.

Next, a sixth exemplary embodiment of the present disclosure will be described below. FIG. 13 is an enlarged cross-sectional view illustrating an element substrate according to the sixth exemplary embodiment.

The exemplary embodiment is identical to the first exemplary embodiment except that second medium refractive index portions mainly differ in configuration. Note that, in the descriptions below, the sixth exemplary embodiment will be described by focusing on differences from the first exemplary embodiment, and descriptions of similar matters will be omitted. In FIG. 13, the same reference numbers are given to the same configurations as in the first exemplary embodiment.

As illustrated in FIG. 13, a second medium refractive index portion 253E serving as a "third portion" includes an outer circumference portion 2535 between the high refractive index portion 251 and the low refractive index insulator 24. That is, a part of the second medium refractive index portion 253E lies between the high refractive index portion 251 and the low refractive index insulator 24. On the side surfaces 2503, the outer circumference portion 2535 surrounds and abuts the high refractive index portion 251 when viewed in a plan view. With the second medium refractive index portion 253E including the outer circumference portion 2535, interface reflection can be suppressed between the high refractive index portion 251 and the low refractive index insulator 24, compared with a case when the outer circumference portion 2535 is not provided. Specifically, as illustrated with a light beam LL4 illustrated in FIG. 13, when the light LL enters from the low refractive index insulator 24 to each of the high refractive index insulators 25, the outer circumference portion 2535 being provided can suppress interface reflection between the high refractive index portion 251 and the low refractive index insulator 24.

Even the exemplary embodiment can increase the utilization efficiency of the light LL, similar to the first exemplary embodiment.

2. Projection-Type Display Apparatus

Figure 14:
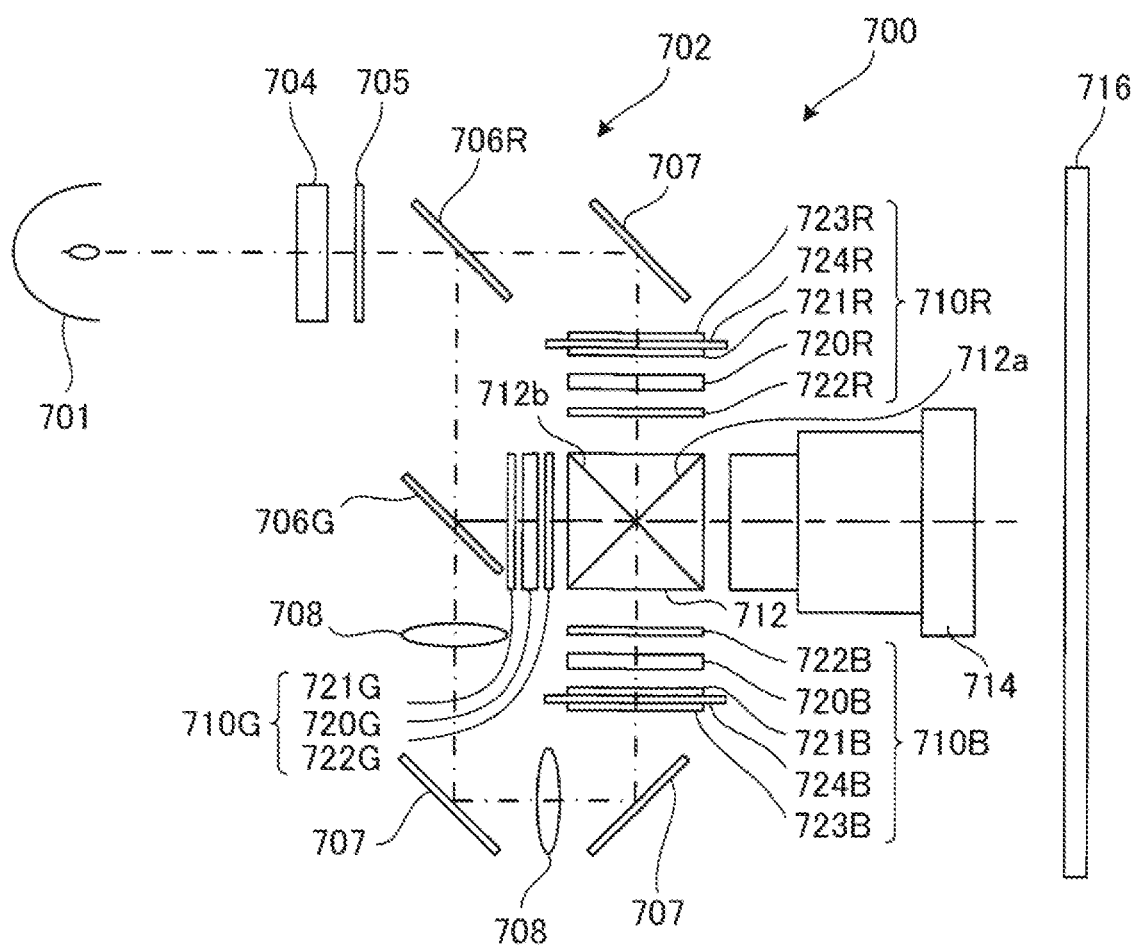
FIG. 14 is a schematic diagram illustrating an example of a projection-type display apparatus.

Next, a projection-type display apparatus will be described as one example of an electronic apparatus according to the present disclosure. FIG. 14 is a schematic diagram illustrating an example of a projection-type display apparatus.

As illustrated in FIG. 14, a projector 700 being a projection-type display apparatus includes a light source device 701, an integrator 704, a polarization conversion element 705, a color light separation and light guide optical system 702, a liquid crystal light modulation device 710R, a liquid crystal light modulation device 710G, and a liquid crystal light modulation device 710B being light modulation devices, a cross dichroic prism 712, and a projection optical system 714. As will be described later in detail, the liquid crystal light modulation devices 710R, 710G, and 710B are respectively provided with liquid crystal devices 720R, 720G, and 720B. For example, the liquid crystal device 100 described above can be used as each of the liquid crystal devices 720R, 720G, and 720B.

The light source device 701 is configured to supply the light LL including red light being first color light, green light being second color light, and blue light being third color light. As the light source device 701, an extra-high-pressure mercury lamp may be used, for example. Hereinafter the red light will be referred to as "R light", green light will be referred to as "G light", and blue light will be referred to as "B light".

The integrator 704 is configured to uniform illuminance distribution of the light LL emitted from the light source device 701. The light LL having the uniformed illuminance distribution is to be converted, by the polarization conversion element 705, to polarized light having a specific vibration direction, such as s-polarized light which is s-polarized relative to a reflection surface of the color light separation and light guide optical system 702. The light converted to the s-polarized light is incident on an R-light transmissive dichroic mirror 706R forming the color light separation and light guide optical system 702.

The color light separation and light guide optical system 702 includes the R-light transmissive dichroic mirror 706R, a B-light transmissive dichroic mirror 706G, three reflection mirrors 707, and two relay lenses 708.

The R-light transmissive dichroic mirror 706R causes the R light to be separated from other lights and to pass through and reflects the G light and the B light. The R light passing through the R-light transmissive dichroic mirror 706R is incident on the reflection mirror 707. The reflection mirror 707 bends a light path of the R light at 90°. The R light having the bent light path is incident on the liquid crystal light modulation device 710R.

The liquid crystal light modulation device 710R serves as a transmissive-type liquid crystal device configured to modulate the R light in accordance with an image signal. The liquid crystal light modulation device 710R includes a λ/2 phase difference plate 723R, a glass plate 724R, a first polarizing plate 721R, the liquid crystal device 720R, and a second polarizing plate 722R. The λ/2 phase difference plate 723R and the first polarizing plate 721R are arranged to be brought into contact with the transmissive glass plate 724R, which does not change the polarizing direction.

The G light and the B light, which are reflected on the R-light transmissive dichroic mirror 706R, each have a light path bent at 90°. The G light and the B light having the bent light paths are each incident on the B-light transmissive dichroic mirror 706G. The B-light transmissive dichroic mirror 706G causes the B light to be separated from other lights and to pass through and reflects the G light. The G light reflected on the B-light transmissive dichroic mirror 706G is incident on the liquid crystal light modulation device 710G. The liquid crystal light modulation device 710G serves as a transmissive-type liquid crystal device configured to modulate G light in accordance with an image signal. The liquid crystal light modulation device 710G includes the liquid crystal device 720G, a first polarizing plate 721G, and a second polarizing plate 722G.

The G light being incident on the liquid crystal light modulation device 710G is to be converted to s-polarized light. The s-polarized light being incident on the liquid crystal light modulation device 710G passes through the first polarizing plate 721G as is, and is incident on the liquid crystal device 720G. For the s-polarized light being incident on the liquid crystal device 720G, the G light is to be converted to p-polarized light through modulation in accordance with an image signal. The p-polarized light converted from the G light by modulation in the liquid crystal device 720G is emitted from the second polarizing plate 722G. The G light thus modulated by the liquid crystal light modulation device 710G is incident on the cross dichroic prism 712.

The B light passing through the B-light transmissive dichroic mirror 706G is incident on the liquid crystal light modulation device 710B through the two relay lenses 708 and the two reflection mirrors 707.

The liquid crystal light modulation device 710B serves as a transmissive-type liquid crystal device configured to modulate B light in accordance with an image signal. The liquid crystal light modulation device 710B includes a λ/2 phase difference plate 723B, a glass plate 724B, a first polarizing plate 721B, the liquid crystal device 720B, and a second polarizing plate 722B. The B light being incident on the liquid crystal light modulation device 710B is to be converted to s-polarized light. The s-polarized light being incident on the liquid crystal light modulation device 710B is to be converted to p-polarized light by the λ/2 phase difference plate 723B. The B light converted to the p-polarized light transmits through the glass plate 724B and the first polarizing plate 721B as is, and is incident on the liquid crystal device 720B. For the p-polarized light being incident on the liquid crystal device 720B, the B light is to be converted to s-polarized light through modulation in accordance with an image signal. The s-polarized light converted from the B light by modulation in the liquid crystal device 720B is emitted from the second polarizing plate 722B. The B light modulated by the liquid crystal light modulation device 710B is incident on the cross dichroic prism 712.

Two dichroic films 712a and 712b are arranged to cross each other in the X shape to form the cross dichroic prism 712 being a color synthesis optical system. The dichroic film 712a reflects the B light, and causes the G light to pass through. The dichroic film 712b reflects the R light, and causes the G light to pass through. The cross dichroic prism 712 as described above is configured to synthesize the R light, the G light, and the B light, which are modulated by the liquid crystal light modulation device 710R, 710G, and 710B, respectively.

The projection optical system 714 is configured to project the light synthesized by the cross dichroic prism 712 to a screen 716. In this manner, a full color image can be obtained on the screen 716.

The projector 700 includes the liquid crystal device 100 described above. The liquid crystal device 100 is superior in utilization efficiency. With the liquid crystal device 100 being provided, brightness of the projector 700 can be improved. Therefore, the projector 700 with excellent quality can be provided.

Note that the liquid crystal device 100 can be used as a front projection projector configured to project a projection image from an observing side and a rear projection projector configured to project a projection image from a side opposite to the observing side.

Note that electronic apparatuses each including the liquid crystal device 100 are not limited to projectors. For example, the liquid crystal device 100 may be used as a projection type Head Up Display (HUD), a direct-view type Head Mounted Display (HMD), or a display unit of an information terminal apparatus, such as an electronic book, a personal computer, a digital still camera, a liquid crystal television, a viewfinder type or monitor direct-view type video recorder, a car navigation system, an electronic organizer, and a point-of-sale (POS).

The liquid crystal device and the electronic apparatus according to the present disclosure are not limited to the exemplary embodiments described above. In addition, the configuration of each component of the present disclosure can be replaced with any configuration that exerts the equivalent functions of the above-described exemplary embodiments, and to which any configuration can be added. Further, any configuration may be combined with each other in the exemplary embodiments of the present disclosure.

As described above, examples of switching elements are TFTs. However, switching elements are not limited to the TFTs, but may be metal-oxide-semiconductor field-effect transistors (MOSFETs), for example.

What is claimed is:

1. A liquid crystal device comprising:
   a base member that is transmissive;
   a pixel electrode that is transmissive;
   a first insulator that is transmissive and that is disposed between the base member and the pixel electrode;
   a second insulator that is transmissive and that, in a plan view from a thickness direction of the base member, surrounds the first insulator and abuts the first insulator, and
   a third insulator that is transmissive and that is disposed between the first insulator and the pixel electrode,
   wherein
   the first insulator includes
   a first portion having a refractive index higher than a refractive index of the second insulator,
   a second portion positioned between the base member and the first portion, the second portion having a refractive index lower than the refractive index of the first portion and higher than the refractive index of the second insulator, and
   a third portion positioned on the third insulator side of the first portion, the third portion having a refractive index lower than the refractive index of the first portion and higher than the refractive index of the second insulator.

2. The liquid crystal device according to claim 1, wherein a part of the third portion is interposed between the first portion and the second insulator.

3. The liquid crystal device according to claim 1, wherein a surface of the first insulator at the base member side includes a convex lens surface.

4. The liquid crystal device according to claim 1, comprising:
   a switching element; and
   a light-shielding body overlapping, in the plan view, with the switching element.

5. The liquid crystal device according to claim 1, wherein the refractive index of the second portion increases stepwise from the base member toward the first portion.

6. The liquid crystal device according to claim 1, wherein the refractive index of the second portion increases continuously from the base member toward the first portion.

7. The liquid crystal device according to claim 1, wherein
   each of constituent materials of the first insulator and the second insulator is a silicon-based inorganic compound containing at least either of oxygen atoms and nitrogen atoms, and
   a content of the nitrogen atoms in the second portion is lower than a content of the nitrogen atoms in the first portion and higher than a content of the nitrogen atoms in the second insulator.

8. An electronic apparatus comprising the liquid crystal device according to claim 1.

* * * * *